(12) United States Patent
Nakao

(10) Patent No.: US 7,187,511 B2
(45) Date of Patent: Mar. 6, 2007

(54) MAGNETIC TAPE AND MANUFACTURING METHOD THEREOF, AND SERVO WRITER

(75) Inventor: Toru Nakao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 59 days.

(21) Appl. No.: 10/819,907

(22) Filed: Apr. 8, 2004

(65) Prior Publication Data

US 2004/0208694 A1 Oct. 21, 2004
US 2005/0105967 A2 May 19, 2005

(30) Foreign Application Priority Data

Apr. 15, 2003 (JP) ............................. 2003-110396

(51) Int. Cl.
*G11B 5/09* (2006.01)
(52) U.S. Cl. ..................... 360/48; 360/77.12; 360/75
(58) Field of Classification Search ................ None
See application file for complete search history.

(56) References Cited

U.S. PATENT DOCUMENTS

| | | | |
|---|---|---|---|
| 4,996,609 A | 2/1991 | Joannou | |
| 5,689,384 A | 11/1997 | Albrecht et al. | |
| 6,078,463 A * | 6/2000 | Pahr | 360/77.12 |
| 6,347,016 B1 | 2/2002 | Ishida et al. | |
| 6,970,312 B2 | 11/2005 | Yip et al. | |
| 2002/0164504 A1* | 11/2002 | Masaki | 428/694 BS |

FOREIGN PATENT DOCUMENTS

JP 08-030942 A 2/1996

* cited by examiner

*Primary Examiner*—Andrea Wellington
*Assistant Examiner*—Varsha A. Kapadia
(74) *Attorney, Agent, or Firm*—Sughrue Mion, PLLC

(57) ABSTRACT

A magnetic tape is characterized in that a servo signal for performing tracking control of a magnetic head is written on a data band, data is recorded on the data band, and the servo signal is magnetized and written on the servo band magnetized in any one of direction of longitudinal directions with being magnetized in a reverse direction for the one direction.

20 Claims, 8 Drawing Sheets

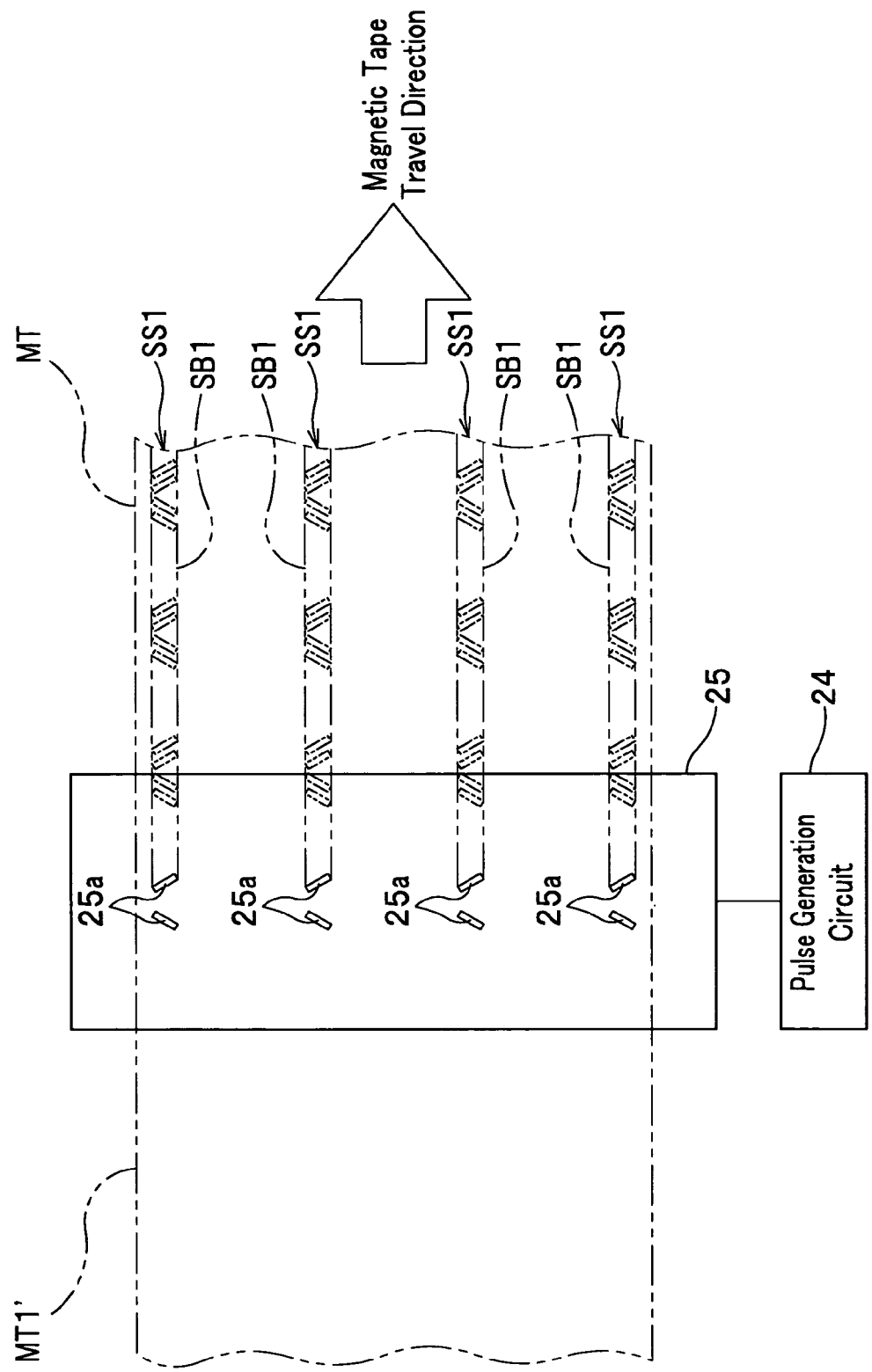

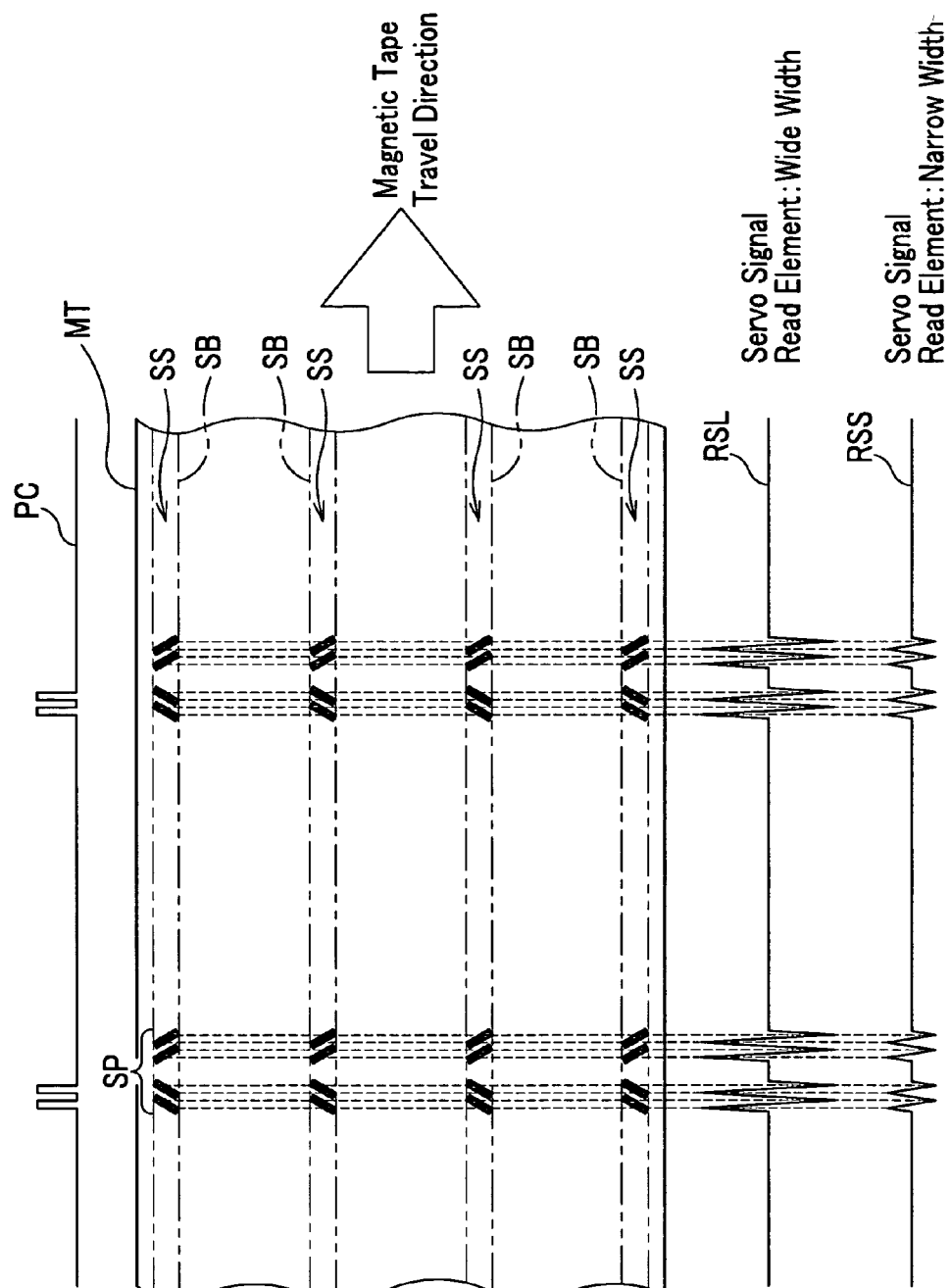

MAGNETIC TAPE AND MANUFACTURING METHOD THEREOF, AND SERVO WRITER

BACKGROUND OF THE INVENTION

1. Field of the Invention

The present invention relates to a magnetic tape where a servo signal to perform tracking control for a magnetic head is written, a manufacturing method thereof, and a servo writer.

2. Description of the Related Art

These years, in a magnetic tape a high density recording has progressed and there is the tape having a capacity of around 100 gigabytes for a backup of a computer. Therefore, several hundreds of data tracks are formed in the magnetic tape in a lateral direction. Accordingly, a width of a data track extremely becomes narrow, and also a distance between adjacent data tracks extremely becomes narrow. Therefore, in order to make a recording/reproducing element of a magnetic head trace the data track, a servo signal is written in the magnetic tape in advance and with reading the servo signal by the magnetic head, a position of the magnetic head (position of the lateral direction of the magnetic tape) is servo-controlled (see Japanese Patent Laid-Open Publication No. Hei 8-30942).

And the servo signal is recorded by giving a recording current to a servo band on non magnetized magnetic tape so as to magnetize the servo band in one direction.

In other words, as shown in FIG. 8B, conventional servo signals SS are formed on non magnetized servo bands SB by flowing a recording current pulse PC consisting of a zero current and a plus pulse current as a recording current in order to avoid a saturation phenomenon of an MR (Magneto Resistive) element. If such the recording current pulse PC is used, as shown in FIG. 8B a magnetic tape MT is not recorded in areas except for servo patterns SP when the recording current pulse PC is the zero current; and when the plus pulse current of the recording current pulse PC flows, the servo patterns SP are magnetized in one direction by a leak magnetic flux from a servo gap, thereby as a result the servo signals SS being written. On the other hand, in a magnetic tape recoding/reproducing apparatus a change point of a magnetization in the servo signals SS is detected with a change of an electric resistance by a servo signal reading element (MR element), and the change point of the magnetization as a read signal is output in a differential waveform (voltage value). Therefore, the larger the electric resistance of the MR element becomes, the higher a peak value of the read signal of the servo signals SS, thereby an SN (Signal/Noise) ratio of the read signal being improved. Accordingly, when changes of the servo signals SS themselves are large and when a read area is large due to a wide width of the servo signal reading element (MR element), as shown in FIG. 8C a peak voltage value of a read signal RSL of the servo signals SS becomes high.

Whereas, hereafter the high density recording of the magnetic tape is foreseen to progress till around several tens of terabytes. Therefore, a number of data tracks of the magnetic tape, the width of the data track, and the distance between the adjacent data tracks become narrower, and the magnetic tape itself becomes a thin layer. Based upon this, an amount of magnetism that is detectable in reading a servo signal decreases and a change of a magnetization amount that is detectable with the servo signal reading element also becomes small. Accordingly, as shown in FIG. 8D a peak voltage value of a read signal RSS of the servo signals SS becomes small, thereby the SN ratio of the read signal RSS worsening. As a result, in the magnetic tape recording/reproducing apparatus the servo signals SS becomes not able to be accurately read, thereby highly accurate position control of the magnetic head being not able to be performed.

Consequently, an improvement of the SN ratio of a read signal of a servo signal and a manufacturing method thereof are requested in the magnetic tape.

SUMMARY OF THE INVENTION

In order to solve problems described above, a first aspect of the present invention is a magnetic tape where a servo signal for performing tracking control of a magnetic head is written on a servo band and data is recorded on a data band, wherein the servo signal is written on the servo band magnetized in any one direction of longitudinal directions with being magnetized in a reverse direction of the one direction.

In such the magnetic tape the servo signal is configured of a pattern that is formed with being magnetized in the reverse direction on the servo band magnetized in any one direction of the longitudinal directions, for example, toward a travel direction of the magnetic tape (this direction is assumed to be "forward direction"). Therefore, when reading the servo signal with a servo signal reading element, a change rate and change amount of a magnetic field at a change portion of a servo pattern magnetized in the reverse direction for a base portion of the forward direction becomes large, thereby an output of the servo signal becoming high. Accordingly, the SN ratio of the read signal of the servo signal can be improved.

A second aspect of the present invention is, in the magnetic tape of the first aspect, characterized that the data band is not magnetized.

Although when data is recorded on the data band, it can be recorded by being overwritten without a demagnetization, magnetism originally recorded gives an influence in overwriting. However, in accordance with the magnetic tape of the second aspect, the data band where data is recorded is not magnetized, and therefore, when a signal is recorded, it can be recorded in a preferable condition without having the influence of the original magnetism.

In addition, in the magnetic tape described in the first and second aspects, an effect of the present invention can be brought out when a thickness of a magnetic layer is 10 nm to 300 nm.

A third aspect of the present invention is a manufacturing method of the magnetic tape described in the first aspect, wherein the manufacturing method has a first process for magnetizing a servo band to write at least a servo signal in any one direction of longitudinal directions; and a second process for writing the servo signal on the servo band in a state where the servo band is magnetized in one direction by the first process, with giving a servo signal recording head a recording current pulse of a single polarity for magnetizing the servo band in the reverse direction of the one direction.

In accordance with such the manufacturing method, the servo band is one-directionally magnetized, for example, toward the travel direction of the magnetic tape (this direction is assumed to be "forward direction") by the first process; and the servo signal is formed with magnetizing the servo band by the second process. Therefore, since when the servo signal is read with a servo signal reading element of a magnetic head, a change rate and change amount of a magnetic field at a change portion of a servo pattern magnetized in the reverse direction for a base portion of the forward direction become large, thus an output of the servo signal becomes high. Accordingly, the SN ratio of a read signal of the servo signal can be improved.

Moreover, a fourth aspect of the present invention is another manufacturing method of the magnetic tape described in the second aspect, wherein the manufacturing method has the first process for magnetizing the servo band to write the servo signal in any one direction of longitudinal directions; the second process for writing the servo signal on the servo band in the state where the servo band is magnetized in the one direction, with giving the servo signal recording head the recording current pulse of the single polarity for magnetizing the servo band in the reverse direction of the one direction; and an demagnetization process for demagnetizing the data band at a following process of the first process and at any of a preceding and following processes of the second process.

Thus demagnetizing the data band by the demagnetization process, the magnetic tape that can surely record data can be manufactured without having an influence of original magnetism in recording the data. Meanwhile, a demagnetization is to defeat magnetism by giving a magnetic field of an alternating current, and for example, it means an alternating current (AC) demagnetization.

A fifth aspect of the present invention is a servo writer used for the manufacturing of the magnetic tape described in the first aspect, which writer is equipped with a magnetic tape travel system that winds the magnetic tape sent out of a supply reel with a winder, thereby running the tape; a DC demagnetizing head for magnetizing at least the servo band in one direction of longitudinal directions of the magnetic tape with contacting a magnetic tape that is running; and a servo write head for writing the servo signal which head is provided at a downstream side of the magnetic tape travel direction of the DC demagnetizing head, contacts the magnetic tape that is running, and thus magnetizes the servo band in the reverse direction.

In accordance with such the servo writer, after the servo band is magnetized in one direction of the longitudinal directions of the magnetic tape with the DC demagnetizing head, a magnetization of the servo band is performed in the reverse direction with the servo write head, so a magnetic tape that is high in a signal output in reading the servo signal, such as the magnetic tape described in the first aspect, can be manufactured.

In such the servo writer the DC demagnetizing head and the servo write head are desirable to be integrally configured.

Thus configured, a relative position relationship of the DC demagnetizing head and the servo write head can be fixed, and without having an influence of a lateral directional vibration of the magnetic tape, a portion of the servo band can be accurately magnetized in one direction of the longitudinal directions of the magnetic tape.

In addition, a sixth aspect of the present invention is another servo writer used for the manufacturing of the magnetic tape described in the second aspect, which writer is equipped a magnetic tape travel system that sends the magnetic tape, whose all surface is magnetized in one direction of longitudinal directions, out of a supply reel, and winds the magnetic tape with a winder, thereby running the tape; an AC demagnetizing head for magnetizing the data band with contacting a magnetic tape that is running; and a servo write head for writing the servo signal with contacting the magnetic tape that is running, and thus magnetizing the servo band in the reverse direction.

In accordance with such the servo writer, the magnetic tape described in the second aspect, where only the data band is demagnetized, that is, the data band is not magnetized, out of the magnetic tape whose all surface is magnetized in the one direction of the longitudinal directions, can be manufactured. Meanwhile, a position of the AC demagnetizing head may be at any of an upstream and downstream sides of the servo write head for the travel direction of the magnetic tape.

In such the servo writer the AC demagnetizing head and the servo write head are also desirable to be integrally configured.

Thus configured, it becomes difficult to receive an influence of a lateral directional vibration, so only the data band can be accurately demagnetized. Meanwhile, "to be integrally configured" described above includes to be configured by joining two components to one.

BRIEF DESCRIPTION OF THE DRAWINGS

In FIGS. 1A, 1B, and 1C.

FIG. 5 is a plan view of a servo write head.

In FIGS. 6A and 6B.

FIGS. 8A to 8D are drawings illustrating a magnetic tape with a conventional servo signal; FIG. 8A is a drawing showing a recording current in writing the servo signal; FIG. 8B is a plan view of the magnetic tape; FIG. 8C is a read signal of the servo signal when a width of a servo read element is wide; FIG. 8D is a read signal of the servo signal when the width of the servo read element is narrow.

DESCRIPTION OF THE PREFERRED EMBODIMENTS

Figure 1A:
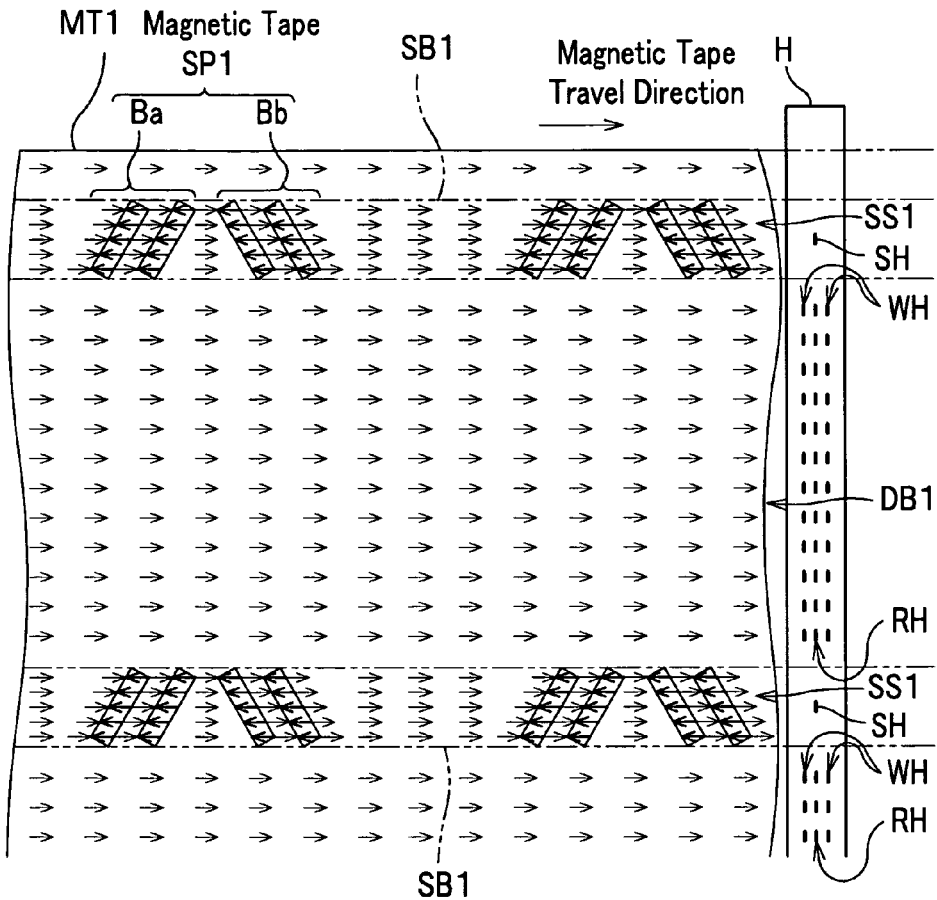
FIG. 1A is an enlarged plan view illustrating a magnetization state of a magnetic tape related to an embodiment of the present invention.

Hereinafter, the embodiments of the present invention will be described in detail, referring to the drawings as needed.

As a first embodiment, one example of a magnetic tape of the present invention will be described.

Figure 1B:
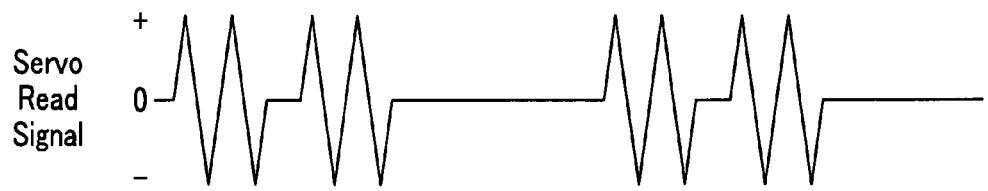
FIG. 1B is a drawing showing a servo read signal from the magnetic tape of FIG. 1A.
Figure 1C:
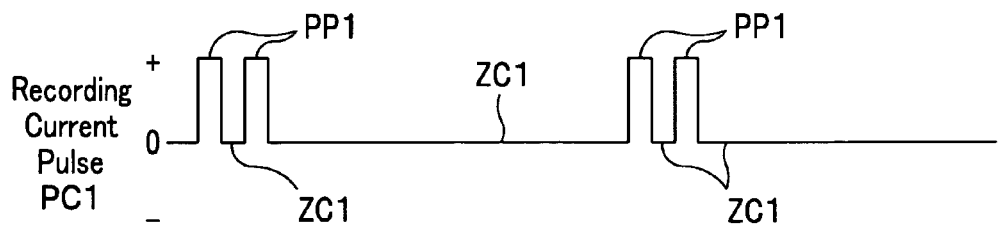
FIG. 1C is a recording current pattern in writing the servo signal.

As shown in FIGS. 1A to 1C, a magnetic tape MT1 related to the first embodiment has a plurality of servo bands SB1 extending in longitudinal directions of the tape and data bands DB1 positioned between respective servo bands SB1. It is magnetized in the travel direction (see an arrow mark in FIG. 1A, and in the embodiment the direction is referred to as "forward direction" as needed) out of the longitudinal directions of the magnetic tape MT1. In FIG. 1A small arrow marks show a magnetization direction. And magnetizing the servo bands SB1 in the reverse direction, servo signals SS1 are written. The servo signals SS1 form each of servo patterns SP1 by: a burst Ba that is a magnetization portion like two stripes making a positively slanted angle for the travel direction (carrying direction) of the magnetic tape MT1; and a burst Bb that is following the burst Ba and is the magnetization portion like two stripes making a negatively slanted angle for the travel direction. And the servo patterns SP1 are repeatedly formed at a predetermined distance in the longitudinal directions, thereby the servo signals SS1 being configured.

And the data bands DB1 between respective servo bands SB1 are also uniformly magnetized in the forward direction. Of course, the magnetic tape MT1 shown in FIG. 1A is a tape where no data is recorded, and when the data is recorded, magnetization portions in the forward direction and the reverse direction are formed on the data bands DB1, depending on a content of data.

Meanwhile, although in the embodiment each of the servo patterns SP1 is configured of each two of positively slanted stripes and negatively slanted stripes, it is variable as needed, for example, such as being configured of each five of the positively slanted stripes and the negatively slanted stripes; and being alternately configured of each five of the positively slanted stripes and the negatively slanted stripes and each four of the positively slanted stripes and the negatively slanted stripes. In addition, in FIG. 1A the servo patterns SP1 are drawn comparatively large for the magnetic tape MT1 in order to be easily understood.

In FIG. 1A is shown a positional relationship of a magnetic head H for the magnetic tape MT1. In the magnetic head H servo read elements SH for reading the servo signals SS1 are parallely provided in a lateral direction of the magnetic tape MT1 (hereinafter simply referred to as "lateral direction) at a same distance as in the plurality of the servo bands SB1. And between each of the servo read elements SH are provided a plurality of data write elements WH ranging in two lines in the lateral direction of the magnetic tape MT1 in order to record signals on the data bands DB1. Furthermore, between the data write elements WH are provided a plurality of data read elements RH ranging in one line in the lateral direction of the magnetic tape MT1.

When for the magnetic tape MT1 thus described, data is recorded/reproduced with the magnetic head H of a magnetic tape drive (not shown), the servo signals SS1 are read with the servo read elements SH. Since the servo patterns SP1 of the servo signals SS1 are slanted for the travel direction (equal to a longitudinal direction) of the magnetic tape MT1 and are formed by respective unparallel stripes, a timing when the servo read elements SH read the servo signals SS1 and detect a pulse differs in accordance with relative positions in the lateral direction of the magnetic tape MT1 and the magnetic head H. Therefore, the data write elements WH or the data read elements RH can be accurately positioned onto predetermined tracks of the data bands DB1 by controlling a position of the magnetic head H so that a timing for reading the pulse becomes a predetermined condition.

Then, an output (peak voltage value) with which the servo read elements SH read the servo signals SS1 depends on a change rate or change amount of a change between a portion where no signal is recorded and another portion where signals are recorded. And in the embodiment a magnetic direction largely varies from the forward direction to the reverse direction at a change portion from the base portion of the servo bands SB1 magnetized in the forward direction to the servo patterns SP1 magnetized in the reverse direction. In addition, the magnetic direction largely varies from the reverse direction to the forward direction also at a change portion from the portion of the servo patterns SP1 magnetized in the reverse direction to the base portion of the servo bands SB1 magnetized in the forward direction. Therefore, depending on the large magnetic change, as shown in FIG. 1B, the servo signals SS1 can be read with a high output. Accordingly, the SN ratio of read signals of the servo signals SS1 can be improved.

Figure 2:
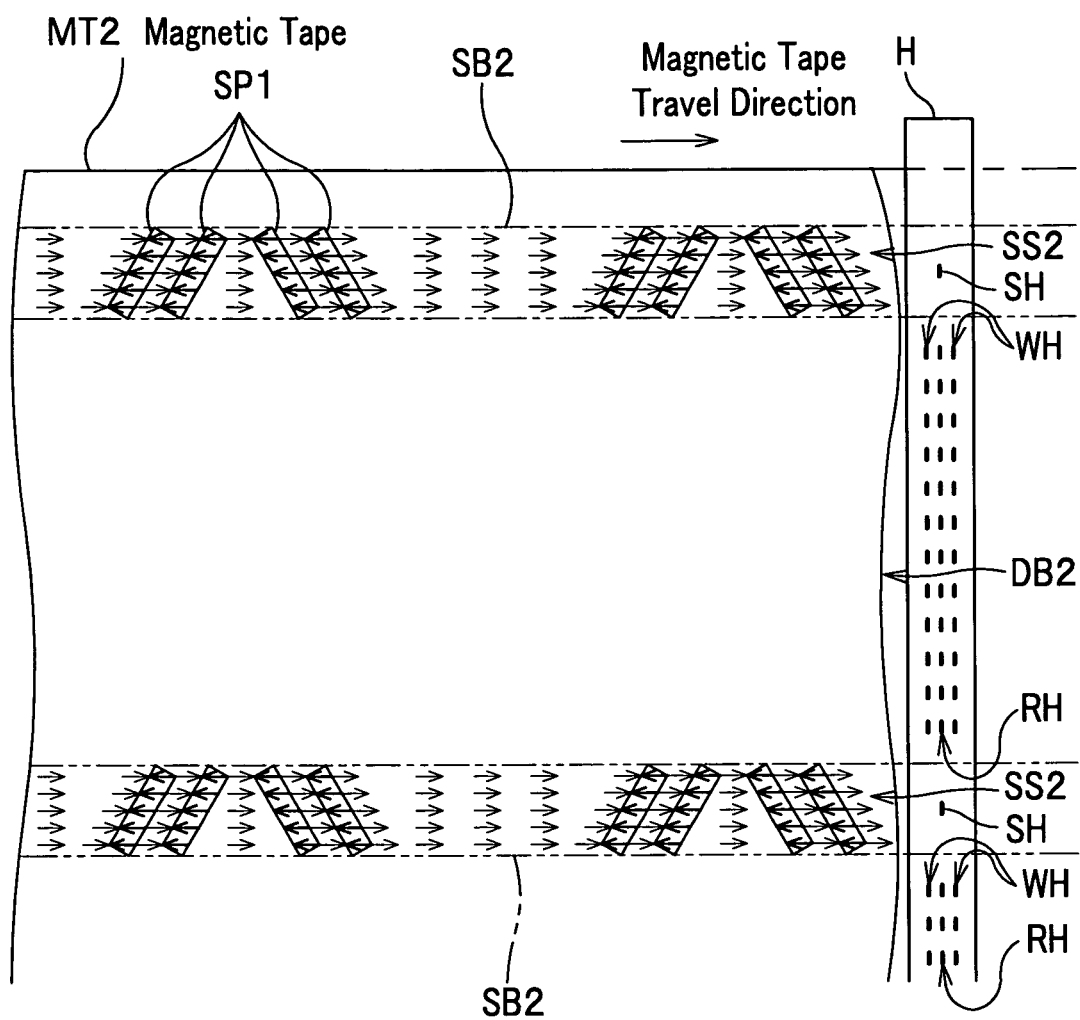
FIG. 2 is a plan view showing a magnetic tape related to a variation example of FIG. 1.

In FIG. 2 is shown a magnetic tape MT2 that is a variation example of the magnetic tape MT1.

Although the magnetic tape MT2 of FIG. 2 also has a plurality of servo bands SB2 extending in longitudinal directions and data bands DB2 same as in the magnetic tape MT1, the servo bands SB2 are magnetized in the forward direction different from the magnetic tape MT1; and whereas the data bands DB2 are not magnetized. When even such the magnetic tape MT2 same as the magnetic tape MT1 reads servo signals SS2 with the servo read elements SH of the magnetic head H, read signals of a high output can be obtained, and thus the SN ratio of the read signals of the servo signals SS2 can be improved since signals are configured by counterchanging the forward direction and the reverse direction. In addition, in accordance with such the magnetic tape MT2, since the data bands DB2 are not magnetized, a magnetization can be sufficiently performed in a needed direction, thereby a recording of data being able to be ensured.

Since the magnetic tape MT1 and the magnetic tape MT2 thus configured are magnetic tapes whose magnetic layers are thin and whose width of data tracks is narrow, they are particularly effectively used when used for a magnetic tape drive where a width of the servo read elements SH for reading the servo signals SS1 and the servo signals SS2 is narrow. That is, conventionally since a care must be taken for the saturation phenomenon of the MR elements, it is avoided to write a servo signal in a direct-current-magnetization portion with magnetizing the servo signal in the reverse direction; however when a magnetic layer is made thin and a width of a data track is made small in order to enlarge a memory capacity per volume, the configurations of the present invention, where a read output of the servo signal can be made high, becomes suitable.

As such a magnetic tape is preferable a case that an Mrt (product of a magnetic layer residual magnetization Mr and a thickness t of a magnetic layer) is $5.0 \times 10^{-10}$ T·m ($4.0 \times 10^{-2}$ memu/cm$^2$) to $7.5 \times 10^{-8}$ T·m (6.0 memu/cm$^2$); is more preferable another case that $5.0 \times 10^{-10}$ T·m ($4.0 \times 10^{-2}$ memu/cm$^2$) to $5.0 \times 10^{-8}$ T·m (4.0 memu/cm$^2$); and is most preferable still another case that $5.0 \times 10^{-10}$ T·m ($4.0 \times 10^{-2}$ memu/cm$^2$) to $2.5 \times 10^{-8}$ T·m (2.0 memu/cm$^2$).

In addition, a Tw (track width of servo read elements) is preferable in a case of 0.1 µm to 30 µm, more preferable in another case of 0.1 µm to 15 µm, and most preferable in still another case of 0.1 µm to 7 µm.

Furthermore, the thickness of the magnetic layer is preferable in a case of 10 nm to 300 nm, more preferable in another case of 10 nm to 200 nm, and most preferable in still another case of 10 nm to 100 nm.

Describing suitable examples of magnetic tapes of the present invention in more detail, the magnetic tapes, which have a non-magnetic layer and a magnetic layer on one face of a support body and a back layer on the opposite face thereof, are preferable. In addition, in a magnetic recording medium of the present invention the magnetic recording medium, which has layers other than the non-magnetic layer, the magnetic layer, and the back layer, are also included. For example, the recording medium may has a soft magnetic layer containing soft magnetic powders, a second magnetic layer, a cushion layer, an overcoat layer, an adhesion layer, and a protection layer. These layers can be provided at adequate positions so as to effectively bring out their functions. A thickness of the non magnetic layer can be made 0.5 µm to 3 µm: the thickness of the non magnetic layer is desirable to be thicker than that of the magnetic layer.

Although a ferromagnetic powder for use in the magnetic layer of the magnetic recording medium of the present invention is not specifically restricted, a ferromagnetic metal powder and a hexagonal ferrite powder are preferable.

An average particle size of the ferromagnetic powder is preferably 20 nm to 60 nm. When the ferromagnetic powder for use in the present invention is acicular and the like, the average particle size represented by an average long axis length is preferably 30 nm to 45 nm, and an average acicular ratio is preferably 3 to 7; when the ferromagnetic powder is platy, the average particle size is represented by an average plate diameter, it is preferably 25 nm to 35 nm, and an average plate ratio is preferably 2 to 5.

In the ferromagnetic metal powder, an $S_{BET}$ (specific surface area of the BET (Brunauer, Emmett and Teller) method) is usually 40 $m^2/g$ to 80 $m^2/g$ and preferably 50 $m^2/g$ to 70 $m^2/g$. A crystal size is usually 10 nm to 25 nm and preferably 11 nm to 22 nm. A pH of the ferromagnetic metal powder is preferably not less than 7. As the ferromagnetic metal powders, a single material and alloy of Fe, Ni, Fe—Co, Fe—Ni, Co—Ni, Co—Ni—Fe, and the like are cited, and within a range of not more than 20 mass percent of metal compositions can be contained aluminum, silicon, sulfur, scandium, titan, vanadium, chromium, manganese, copper, zinc, yttrium, molybdenum, rhodium, palladium, gold, tin, antimony, boron, barium, tantalum, tungsten, renium, silver, lead, phosphorus, lanthanum, cerium, praseodymium, neodymium, tellurium, bismuth, and the like. In addition, the ferromagnetic metal powders may also contain a small amount of water, a hydroxide, and an oxide. Manufacturing methods of these ferromagnetic metal powders are already well known and ferromagnetic metal powders for use in the present invention can also be manufactured in accordance with well known methods. Although shapes of the ferromagnetic metal powders are not particularly restricted, usually an acicular shape, a grit shape, a cubic shape, a rice grain shape, a plate shape, and the like are used. It is specifically preferable to use acicular ferromagnetic metal powders.

A coercivity Hc of the ferromagnetic metal powders is preferably 144 kA/m to 300 kA/m and more preferably 160 kA/m to 224 kA/m. In addition, a saturation magnetization thereof is preferably 85 $A \cdot m^2/kg$ to 150 $A \cdot m^2/kg$ and more preferably 100 $A \cdot m^2/kg$ to 130 $A \cdot m^2/kg$.

As the hexagonal ferrite powders there are a barium ferrite, a strontium ferrite, a lead ferrite, a calcium ferrite, and various replacement materials, for example, a Co replacement material, and the like. To be more precise, are cited a magnetoplumbite type of barium ferrite and strontium ferrite, the magnetoplumbite type of ferrite whose particle surface is covered with spinel, further a compound magnetoplumbite type of barium ferrite and strontium ferrite that partially contain a spinel phase, and the like; and other than predetermined elements, following ones may be contained: Al, Si, S, Ba, Nb, Sn, Ti, V, Cr, Cu, Y, Mo, Rh, Pd, Ag, Sb, Te, W, Re, Au, Bi, La, Ce, Pr, Nd, P, Co, Mn, Zn, Ni, B, Ge, and the like. Generally, the hexagonal ferrite powder where following compounds are added can be used: Co—Zn, Co—Ti, Co—Ti—Zr, Co—Ti—Zn, Ni—Ti—Zn, Nb—Zn—Co, Sn—Zn—Co, Sn—Co—Ti, Nb—Zn, and the like. Some hexagonal ferrite powders contain a specific impurity in accordance with materials and/or manufacturing methods. The hexagonal ferrite powders are a hexagonal plate shape.

When reproducing with a magneto resistive head (MR head) to particularly raise a track density, it is requested to make a noise low: if an average plate diameter is too small, a stable magnetization cannot be desired due to heat fluctuations. In addition, if the average plate diameter is too large, the noise is high, thereby both cases being unfit for the high density recording. Although if the average plate ratio is small, a filling property in the magnetic layer becomes large and it is preferable, a sufficient orientation cannot be obtained. If the filling property is too large, the noise becomes high due to stacking between powders. The specific surface area in accordance with the BET method is usually 30 $m^2/g$ to 200 $m^2/g$, and 50 $m^2/g$ to 100 $m^2/g$ is preferable. The specific surface area generally accords with an arithmetic calculation value from a powder plate diameter and a thickness thereof. A distribution of the plate diameter and the thickness is preferable to be narrower. Although many distributions are not a normal distribution with being calculated in a standard deviation for a powder size, it is expressed as σ/(average plate diameter or average thickness) =0.1 to 0.5. In order to make a powder size distribution sharp, it is performed to make a powder generation-reaction system uniform as much as possible and to also dispense a distribution improvement treatment to a generation powder. For example, such a method of selectively dissolving an ultra minuscule powder in an acid solution is also known. In a vitrification-crystallization method a more uniform powder is obtained by performing heat treatments plural times and separating nucleus generation and growth. Although the corercivity Hc measured in a magnetic powder can be made till around 40 kA/m to 400 kA/m, 144 kA/m to 300 kA/m is preferable. Although a high Hc is advantageous in the high density recording, an ability of a recording head is restricted. An Hc can be controlled by the powder size (plate diameter and plate thickness), kinds and amounts of contained elements, replacement sites of elements, powder generation-reaction conditions, and the like.

A saturation magnetization σ s is preferably 30 $A \cdot m^2/kg$ to 70 $A \cdot m^2/kg$. The σ s tends to become smaller as a powder becomes minuscule. For manufacturing methods thereof, there are a method of lessening crystallization temperature or heat treatment time, another method of increasing addition compounds, still another method of increasing an amount of surface treatment, and the like.

In addition, it is possible to use a W type of a hexagonal ferrite. In dispersing the magnetic material a surface of a magnetic powder is also treated with a dispersion medium and a material matching a polymer. An inorganic compound and an organic compound are used as a surface treatment agent. As main compounds typical examples are: an oxide and hydroxide of Si, Al, P, and the like; various silane coupling agents; and various titan coupling agents. An amount thereof is 0.1 to 10 mass percent for a magnetic material. A pH thereof is also important for dispersion. It is usually around 4 to 12, and although there is an optimum value thereof in accordance with the dispersion medium and the polymer, around 6 to 11 is selected from a chemical stability and storage stability of the recording medium. A water content contained in the magnetic material also influences the dispersion. Although there is an optimum value in accordance with the dispersion medium and the polymer, usually 0.1 to 2.0 mass percent is selected. The present invention does not select manufacturing methods although there are methods as follows: (1) a vitrification-crystallization method of mixing metal oxides, which replaces a barium carbonate, an iron oxide, and an iron, with such a boron oxide as a glass forming material so as to become a predesired ferrite composition, then melting it, making an amorphous material by rapid cooling, next dispensing a reheating treatment, and then cleaning and pulverizing it, thereby obtaining a barium ferrite crystalline powder; (2) a water-heat reaction method of neutralizing a metal salt solution of a barium ferrite composition with alkali, removing byproducts, then heating it in a liquid phase at not less than 100 degrees Celsius, and then cleaning and pulverizing it, thereby obtaining the barium ferrite crystalline powder; and (3) a coprecipitation method of neutralizing the metal salt solution of the barium ferrite composition with alkali, removing byproducts, then drying it, performing a heat treatment at not more than 1100 degrees Celsius, and pulverizing it, thereby obtaining the barium ferrite crystalline powder.

Next, as a second embodiment of the present invention a manufacturing method of a magnetic tape will be described. In the second embodiment is described a case of manufacturing the magnetic tape MT1 where a magnetization of all surface of the magnetic tape is oriented in the forward direction.

Figure 3:
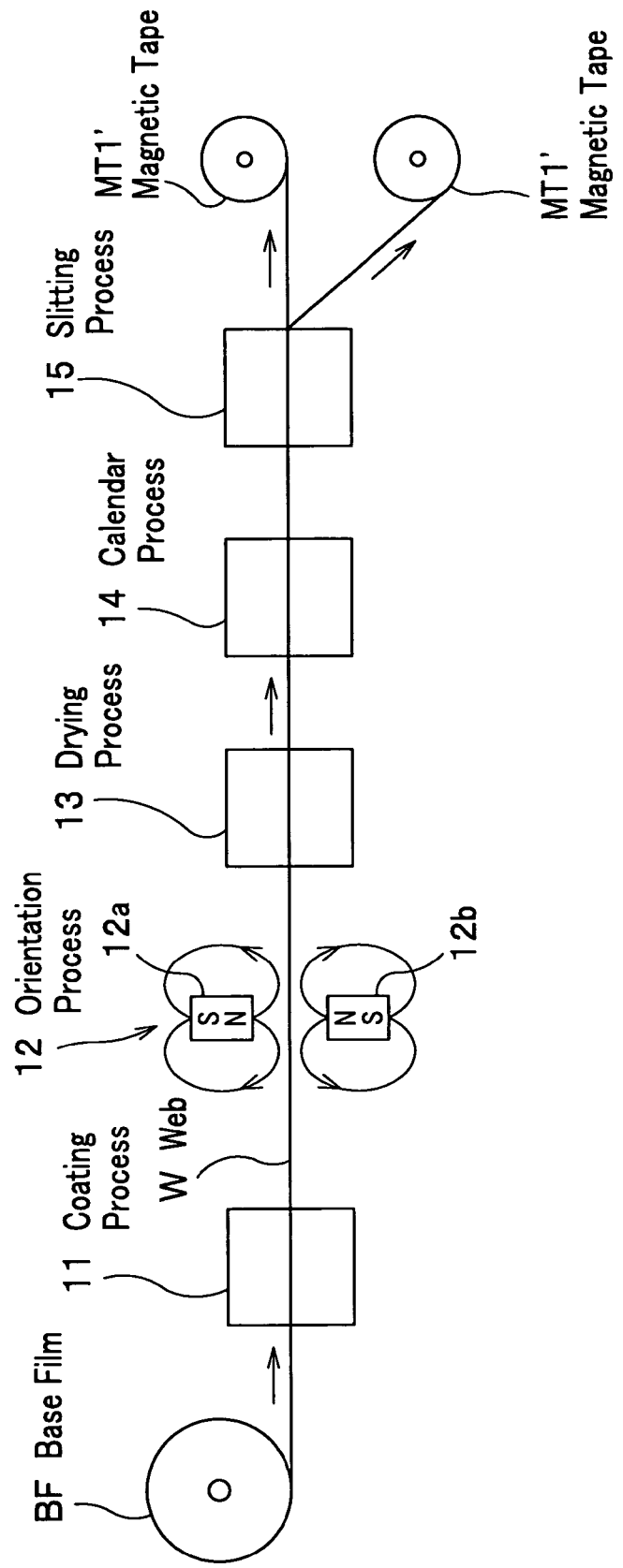
FIG. 3 is a drawing illustrating a part of a manufacturing process of a magnetic tape.

FIG. 3 is a drawing illustrating a part of a manufacturing process of a magnetic tape.

As shown in FIG. 3, the magnetic tape MT1' is manufactured by passing a base film BF through a coating process 11, an orientation process 12, a drying process 13, a calendar process 14, and a slitting process 15. Meanwhile, the magnetic tape MT1' that has finished till the slitting process 15 is a tape where a servo signal is not yet recorded.

The base film BF is a wide film comprised of polyethylene terephthalate (PET) and the like.

In the coating process 11 a magnetic paint where magnetic powders are dispersed in a solvent is coated on one face of the base film BF. In addition, in some products a back coat layer is also coated.

In the orientation process 12, before the magnetic paint coated in the coating process 11 is completely dried, an orientation of the magnetic material is oriented. A web W where the magnetic paint is coated is made to pass between two magnets 12a and 12b whose same polarities (N polarities in the drawing) are made opposite. By sandwiching the web W with the same polarities of the magnets like these, magnetic lines that are parallel to web's faces and along a longitudinal direction (forward direction) can be made, whereby magnetic powders within the magnetic paint before drying are oriented in a same direction as that of a magnetic line (forward direction). Meanwhile, the magnets may be any of a permanent magnet and an electromagnet.

The drying process 13 dries the magnetic paint by an infrared ray, hot air, and the like.

The calendar process 14 compresses the web W by each roller comprised of metal and the like, and heightens a smoothness of a magnetic layer surface.

The slitting process slits the web W whose width is wide into narrow tape forms, and makes them magnetic tapes MT1', thereby separately winding each tape.

Figure 4:
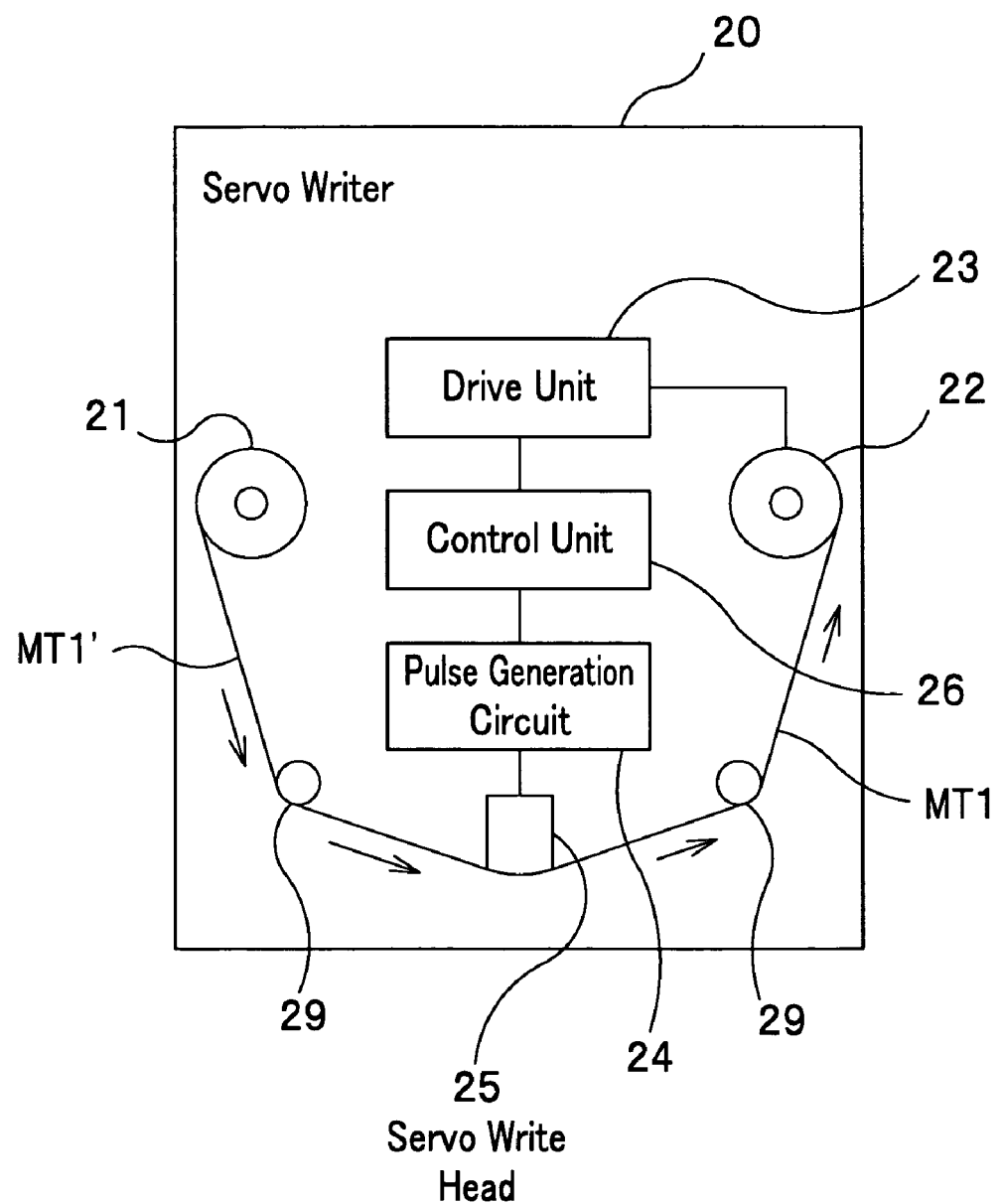
FIG. 4 is a configuration drawing of a servo writer used for writing a servo signal on a magnetic tape.

FIG. 4 is a configuration drawing of a servo writer used for a process where a servo signal is written in a magnetic tape; and FIG. 5 is a plan view of a servo write head.

A servo writer 20 is mainly equipped with a supply reel 21, a winder 22, a drive unit 23, a pulse generation circuit 24, a servo write head 25, and a control unit 26. In addition, the servo writer 20 is also equipped with a power source unit, a cleaning unit for cleaning the magnetic tape MT1, a verification unit for inspecting written servo signals SS1, and the like, not shown.

In the supply reel 21 one of the magnetic tapes MT1' slit into a product width from a wide whole web before the servo signals SS1 are written is set in a large diameter winding of a pancake, and the supply reel 21 sends out the magnetic tape MT1' in writing the servo signals SS1. The magnetic tape MT1' sent out from the supply reel 21 is carried to the servo write head 25 by being guided with a guide 29 and the like. And the magnetic tape MT1 where the servo signals SS1 are written with the servo write head 25 is carried to the winder 22 by being guided with another guide 29 and the like. The winder 22 is rotated by the drive unit 23, and winds the magnetic tape MT1 where the servo signals SS1 are written.

The drive unit 23 is a unit for rotating the winder 22, and is equipped with a motor not shown, a motor drive circuit for supplying a motor current, a gear for coupling a motor shaft and the winder 22, and the like. The drive unit 23 generates the motor current in the motor drive circuit, based on a motor current signal from the control unit 26, supplies the motor current to the motor, and furthermore, transmits rotation drive force of the motor through the gear, thereby rotating the winder 22.

The pulse generation circuit 24 is a circuit for supplying the recording current pulse PC1 (see FIG. 1C), and is equipped with various electronic components. The pulse generation circuit 24 continually generates a plus pulse current PP1 of a plus polarity, a zero current ZC1, another plus pulse current PP1, and another zero current ZC1 in this order, based on a pulse control signal from the control unit 26, and then repeats a pattern where no current (zero current ZC) for a predetermined time is generated, thereby generating the recording current pulse PC1 (see FIG. 1C). And the pulse generation circuit 24 supplies each recording current pulse PC1 to a coil (not shown) of the servo write head 25. Meanwhile, a current value of the plus pulse currents PP1 is an sufficient current value to magnetize a magnetic layer of the magnetic tape MT1' by a leak magnetic flux from head gaps 25a, and is set by taking coil characteristics of the servo write head 25 into consideration. In addition, a pulse width (time) of the plus pulse current PP1 can prescribe a predetermined width of the servo patterns SP1 in longitudinal directions, and is set by taking a running speed of the magnetic tape MT1', a shape of the head gaps 25a of the servo write head 25, and the like into consideration (see FIG. 5). In addition, a predetermined time of the zero currents ZC1 can prescribe a predetermined interval for forming the servo patterns SP1, and is set by taking the running speed of the magnetic tape MT1' and the like into consideration.

The servo write head 25 is a head for writing the servo signals SS1, is equipped with the coil (not shown) for generating a magnetic flux, and the head gaps 25a are formed (see FIG. 5). In the head gaps 25a four pieces of the head gaps 25a are arranged in a line. They are formed by a lithography where semiconductor technology is applied, and have a bottom-open unparallel reverse V letter shape with a predetermined angle for longitudinal directions of the magnetic tape MT1.

The control unit 26 is a unit for controlling operation of each part of the servo writer 20, and is equipped with a CPU (Central Processing Unit), various memory units, and the like. The control unit 26 generates the motor current signal for controlling the motor current of the drive unit 23, and sends it to the drive unit 23. In addition, in order to set a longitudinal direction width of the servo patterns SP1 and the servo signals SS1 that prescribe the predetermined interval for forming the servo patterns SP1, the control unit 26 generates a pulse control signal for controlling a current value of each plus pulse current PP1, a control signal, and a generation timing of the recording current pulse PC1 and sends them to the pulse generation circuit 24. That is, the control unit 26 generates a pulse pattern of a plus pulse current PP1 to a zero current ZC1 to another plus pulse current PP1 to another zero current ZC1.

A process for writing the servo signals SS1 in the magnetic tape MT1' before the signals SS1 are written with using the servo writer thus described will be described.

First, at the supply reel 21 of the servo writer 20 a pancake shape of the magnetic tape MT1' after a slit is set, and a top of the tape MT1' is joined at a core of the winder 22. Here, something to be taken care of in the embodiment of the present invention is to use the magnetic tape MT1' as it is without a demagnetization thereof although conventionally the servo signals SS1 are written after a magnetization given in one direction (forward direction) in the orientation process is entirely demagnetized, and then the servo signals SS1 are written.

The magnetic tape MT1' runs with being wound in the winder 22 that is driven by the drive unit 23 while the tape MT1' is guided with the guides 29 and the like. And the servo signals SS1 are written by the servo write head 25 contacting the tape MT1'.

When writing the servo signals SS1, a pulse train of the recording current pulse PC1 is flowed to the coil of the head gaps 25a of the servo write head 25 at the predetermined pattern. In the recording current pulse PC1 the currents of a plus pulse current PP1 to a zero current ZC1 to another plus pulse current PP1 to another zero current ZC1 appear at a predetermined period. If the recording current pulse PC1 is supplied from the pulse generation circuit 24, the servo write head 25 magnetizes the magnetic layer of the magnetic tape MT1' in the reverse direction by the leak magnetic flux from the head gaps 25a when each plus pulse current PP1 flows in the coil; and the head 25 does not magnetize the magnetic layer of the magnetic tape MT1' when the current PC1 is each zero current ZC1. As a result, the servo patterns SP1 magnetized in the reverse direction are formed on the servo bands SB1 that are the base magnetized in the forward direction of the magnetic tape MT1'. Of course, the portion of the servo bands SB1 other than the servo patterns SP1 is magnetized in the forward direction as it is (see FIG. 1).

The magnetic tape MT1 where the servo signals SS1 are written is wound in the winder 22. Then, it is slit into a tape length in accordance with a product specification, and is put in a cartridge case and the like (not shown).

The magnetic tape MT1 is manufactured by the manufacturing method thus described, and using the tape MT1, the effect described above can be obtained. That is, since a magnetization direction of a base portion of the servo bands SB1 and that of the portion of the servo patterns SP1 are reverse by 180 degrees, a magnetization change is large at a change portion between the servo patterns SP1 and the base portion of the servo bands SB1, thereby the patterns SP1 being able to be read in a high output.

In addition, since the manufacturing method of the second embodiment thus described is a method for writing the servo signals SS1 after the orientation process 12 without a demagnetization, there is an effect that the method can suppress a manufacturing cost than a conventional method can.

Next, a manufacturing method of a magnetic tape related to a third embodiment will be described. In the third embodiment will be described a case where a magnetic tape MT2 demagnetized on data bands DB2 thereof is manufactured. Meanwhile, in the embodiment a description will be omitted with adding same symbols for same portions in the second embodiment.

Figure 6A:
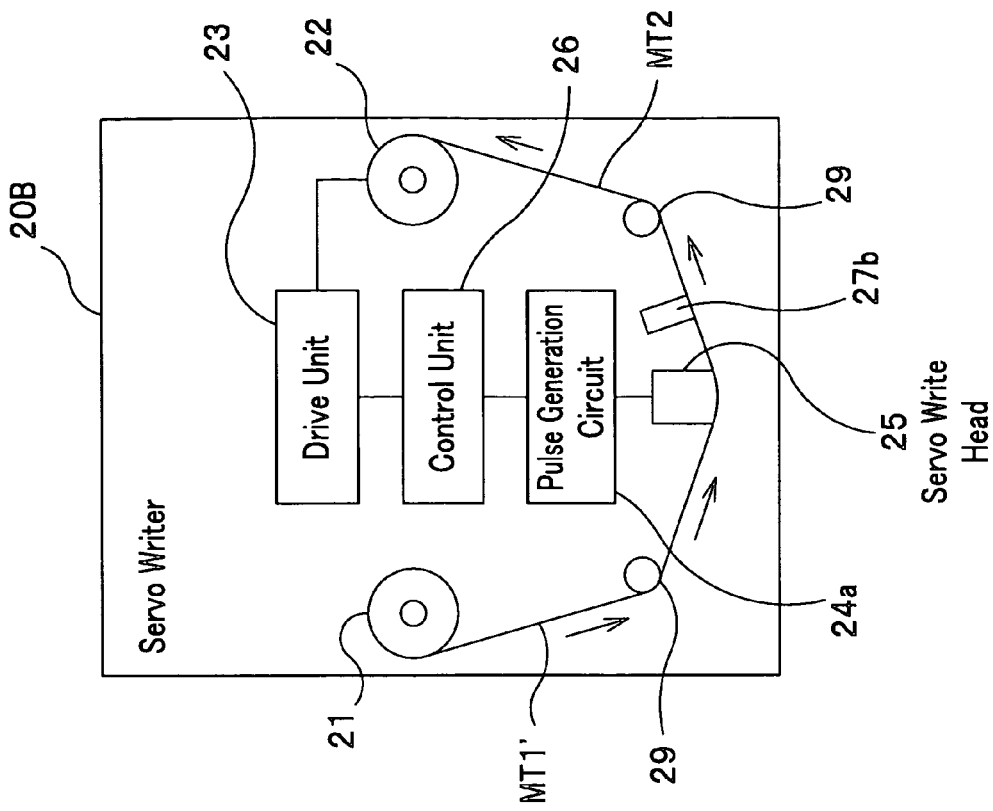
FIG. 6A is a configuration drawing of a servo writer of a third embodiment.

When manufacturing the magnetic tape MT2, first, same as in the second embodiment, manufacture the magnetic tape MT1' (see FIG. 3) where magnetism is oriented in one direction (forward direction). And write servo signals SS2 in the magnetic tape MT1' with a servo writer 20A as shown in FIG. 6A. The servo writer 20A differs from the servo writer 20 in the second embodiment (see FIG. 4) in nothing but a point that a demagnetizing head 27a is provided.

The demagnetizing head 27a is an AC delete head provided at an upstream side of the servo write head 25, with being integrated with the head 25. In the demagnetizing head 27a magnetic gaps (not shown) for a demagnetization are provided at no position except for a lateral direction position, corresponding to the data bands DB2 formed in the magnetic tape MT2 shown in FIG. 2. Of course, it suffices not to demagnetize a portion of servo bands SB2, and in portions not used for recording other than the data bands DB2, a demagnetization may be performed.

In addition, a pulse generation circuit 24a is configured so as to continually give demagnetizing signals to the demagnetizing head 27a.

When writing the servo signals SS2 with the servo writer 20A, run the magnetic tape MT1' sent out of the supply reel 21 while guiding the tape MT1' with the guides 29 and the like. And on the way, give the demagnetizing signals to the demagnetizing head 27a from the pulse generation circuit 24a and demagnetize the portion of the data bands DB2, and then write the servo signals SS2 by magnetizing the magnetic tape MT1' with the servo write head 25 in the reverse direction same as in the second embodiment.

Since in such the servo writer 20A the servo write head 25 and the demagnetizing head 27a are integrally configured, the writer 20A can leave magnetism in the forward direction of the portion of the servo bands SB2 with accurately demagnetizing no portion except for the data bands DB2, without receiving an influence of a vibration in running of the magnetic tape MT1'.

Figure 6B:
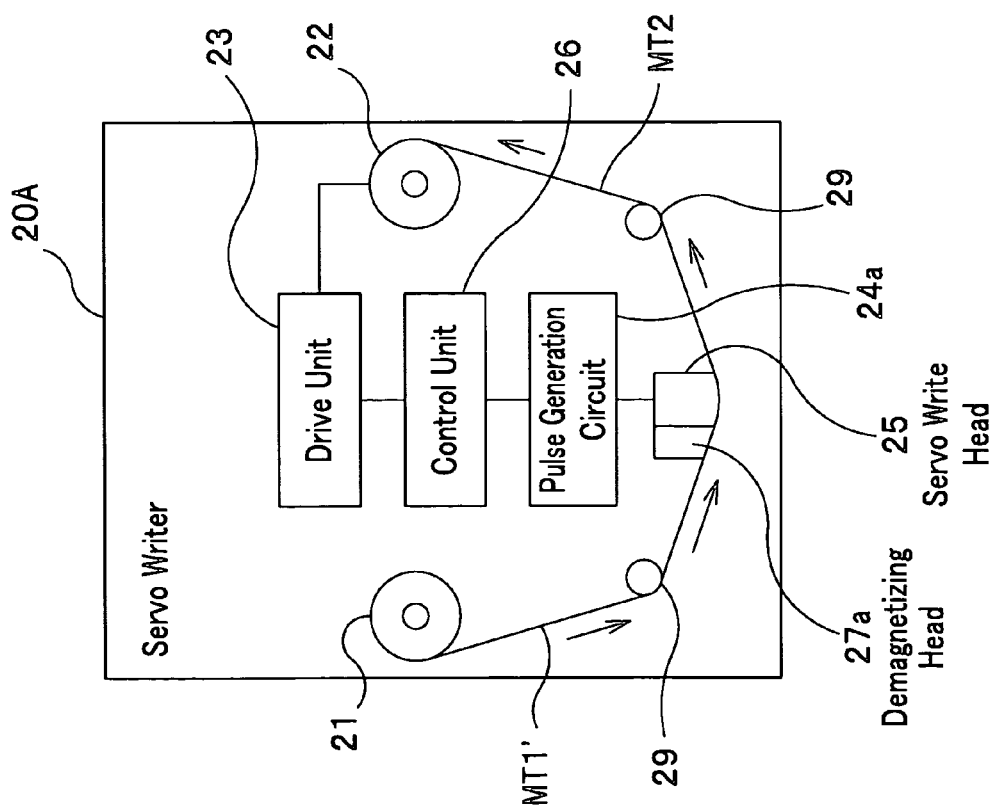
FIG. 6B is a variation example of FIG. 6B.

Meanwhile, although in the embodiment the demagnetizing head 27a is provided with being integrated with the servo write head 25, the demagnetizing head 27a may be provided separately from the write head 25 like a demagnetizing head 27b of a servo writer B shown in FIG. 6B. In addition, the demagnetizing head 27b can also be provided not at an upstream side but at a downstream side.

Furthermore, as another manufacturing method of the magnetic tapes MT1 and MT2, a fourth embodiment will be described.

As described above, when generally manufacturing a magnetic tape different from the first and second embodiments, orient particles of a magnetic material by the orientation process 12, fix the particles of the magnetic material by the drying process 13, and then defeat a magnetic orientation by a demagnetization process.

When manufacturing the magnetic tape MT1 with using a magnetic tape whose magnetic orientation is removed, provide a DC delete head 28 at the upstream side of the servo write head 25 for magnetizing (direct current magnetization) the magnetic tape MT1' over all width thereof. And before writing the servo signals SS1 in a magnetic tape MT1" after a demagnetization of the tape MT1", magnetize the tape MT1" in advance. Then, if writing the servo signals SS1 with the servo write head 25 same as in the first embodiment, it can manufacture the magnetic tape MT1 where the servo signals SS1 are written in a reverse magnetization within a portion magnetized in the forward direction on all surface thereof.

Figure 7:
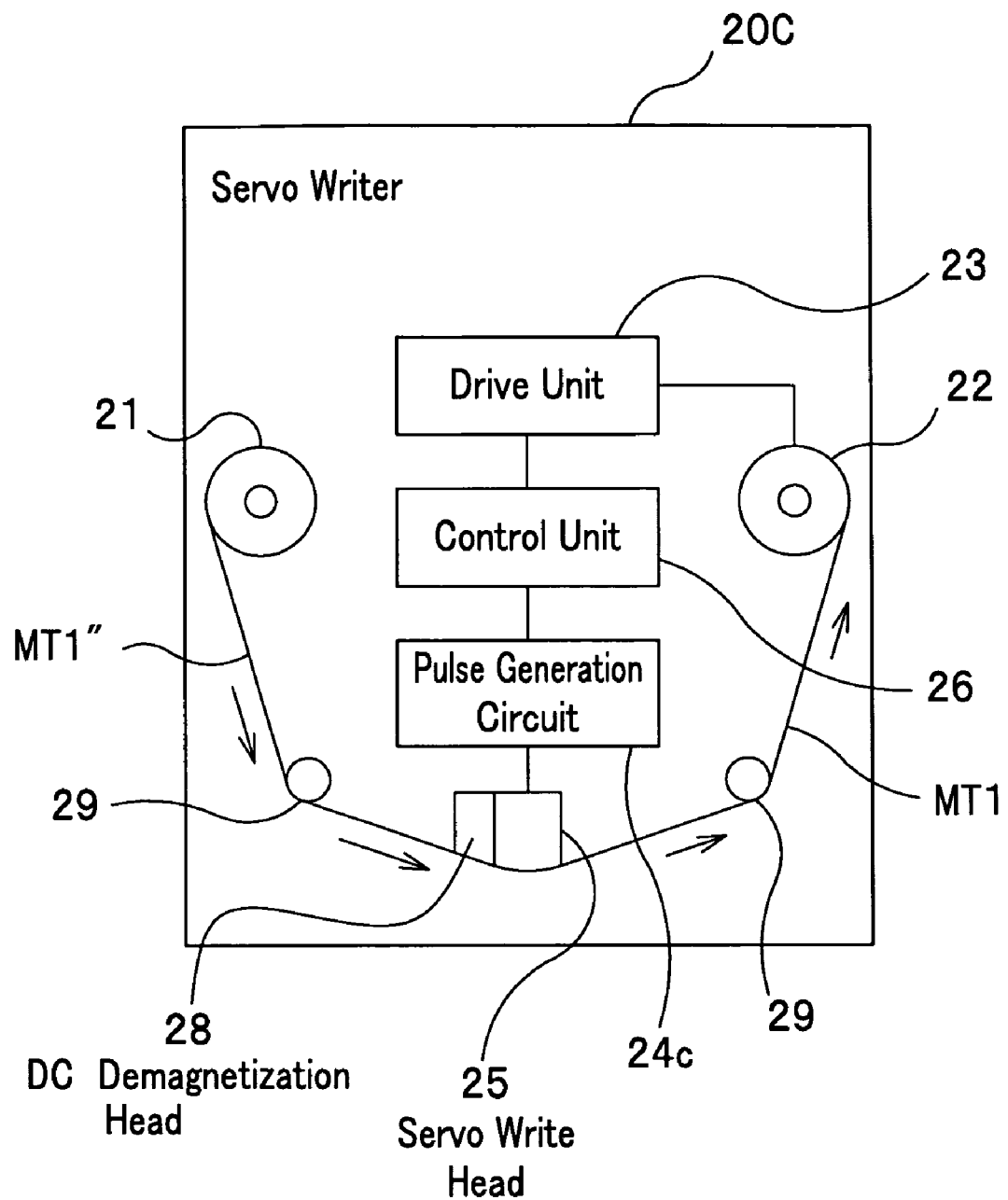
FIG. 7 is a configuration drawing of a servo writer of a fourth embodiment.

In addition, when manufacturing the magnetic tape MT2 with using a magnetic tape whose magnetic orientation is removed, provide magnetic gaps corresponding to the servo bands SB2 at no position except for a lateral direction position in advance, and magnetize the bands SB2 in the forward direction with the DC delete head 28 of FIG. 7 described above. Then, if writing the servo signals SS2 on the servo bands SB2, it can manufacture the magnetic tape MT2.

Thus, although the embodiments of the present invention are described, the invention is implemented in various forms without being limited to the embodiments.

For example, although in the embodiments a recording current is designed to consist of a pulse current where a pulse current of a plus polarity and a zero current are alternately repeated, another pulse current where a pulse current of a minus polarity and the zero current are alternately repeated may be used.

In addition, although in the embodiments a base portion of servo bands is magnetized in the forward direction and a portion of servo signals is magnetized in the reverse direction, on the contrary the base portion of the servo bands is magnetized in the reverse direction and then the portion of the servo signals may also be magnetized in the forward direction.

What is claimed is:

1. A manufacturing method of a magnetic tape, the method comprising:
   a first process for magnetizing a servo band for writing at least a servo signal in any one direction of longitudinal directions; and
   a second process for writing said servo signal on said servo band in a state where said servo band is magnetized in one direction by said first process with giving a recording current pulse of a single polarity for magnetizing the servo band in a reverse direction for said one direction to a servo signal recording head; and
   a demagnetization process for demagnetizing a data band, wherein said demagnetizing process follows said first process and either precedes or follows said second process.

2. A magnetic tape manufacturing method according to claim 1, wherein said data band is not magnetized.

3. A magnetic tape formed according to claim 1, wherein a product of residual magnetism and a thickness of a magnetic layer is $5.0 \ 10^{-10}$ T m to $7.5 \ 10^{-8}$ T m.

4. A magnetic tape formed according to claim 1, wherein a product of residual magnetism and a thickness of a magnetic layer is $5.0 \ 10^{-10}$ T m to $5.0 \ 10^{-8}$ T m.

5. A magnetic tape formed according to claim 1, wherein a product of residual magnetism and a thickness of a magnetic layer is $5.0 \ 10^{-10}$ T m to $2.5 \ 10^{-8}$ T m.

6. A magnetic tape drive for reading a magnetic tape formed according to claim 1, wherein a track width of a servo signal reading element is 0.1 μm to 30 μm.

7. A magnetic tape drive for reading a magnetic tape formed according to claim 5, wherein a track width of a servo signal reading element is 0.1 μm to 15 μm.

8. A magnetic tape drive for reading a magnetic tape formed according to claim 1, wherein a track width of a servo signal reading element is 0.1 μm to 7 μm.

9. A magnetic tape formed according to claim 1, wherein a ferromagnetic powder used for a magnetic layer is any of a ferromagnetic metal powder and a hexagonal ferrite powder.

10. A magnetic tape formed according to claim 1, wherein an average particle size of a ferromagnetic metal powder is 20 nm to 60 nm.

11. A magnetic tape formed according to claim 1, wherein a ferromagnetic powder is acicular, an average particle size of said ferromagnetic powder is 30 nm to 45 nm, and an average acicular ratio of said ferromagnetic powder is 3 to 7.

12. A magnetic tape formed according to claim 1, wherein a ferromagnetic powder is platy, an average particle size of said ferromagnetic powder is 25 nm to 35 nm, and an average plate ratio of said ferromagnetic powder is 2 to 5.

13. A magnetic tape formed according to claim 1, wherein said servo band is magnetized in only one direction, and the servo pattern is magnetized in the opposite direction of said servo band.

14. A magnetic tape formed according to claim 13, further comprising a plurality of servo bands, wherein each servo band is magnetized in an identical direction.

15. A magnetic tape formed according to claim 1, wherein said servo signal for performing tracking control of a magnetic head is written on a servo band and where data is recorded on a data band, and
   wherein said servo signal is written on the servo band magnetized in any one direction of longitudinal directions with a servo pattern being magnetized in a reverse direction of said one direction.

16. A servo writer used for manufacturing a magnetic tape, the writer comprising:
   a magnetic tape travel system for running said magnetic tape by sending out the magnetic tape, whose all surface is magnetized in one direction of longitudinal directions, from a supply reel and winding the magnetic tape with a winder;
   a demagnetizing head for demagnetizing a data band with contacting said magnetic tape which is running; and
   a servo write head for writing a servo signal, with contacting said magnetic tape, which is running, and magnetizing a magnetic layer of a servo band in a reverse direction, wherein
   the demagnetization follows said surface magnetization and either precedes or follows said writing of the servo signal.

17. A servo writer according to claim 16, wherein said demagnetizing head and said servo write head are integrally configured.

18. A servo writer according to claim 16, wherein a position of said demagnetizing head is at an upstream side of said servo write head for a travel direction of said magnetic tape.

19. A servo writer according to claim 16, wherein a position of said demagnetizing head is at a downstream side of said servo write head for a travel direction of said magnetic tape.

20. A servo writer according to claim 16, wherein said data band is not magnetized.

* * * * *